United States Patent
Bae

(10) Patent No.: US 7,062,659 B2
(45) Date of Patent: Jun. 13, 2006

(54) APPARATUS FOR PROTECTING CODE ROM DATA IN CODE ROM TEST

(75) Inventor: Jong-Hong Bae, Ichon-shi (KR)

(73) Assignee: ABOV Semiconductor Co., Ltd., Cheongju-si (KR)

( * ) Notice: Subject to any disclaimer, the term of this patent is extended or adjusted under 35 U.S.C. 154(b) by 931 days.

(21) Appl. No.: 10/043,290

(22) Filed: Jan. 14, 2002

(65) Prior Publication Data
US 2003/0120941 A1    Jun. 26, 2003

(30) Foreign Application Priority Data
Dec. 24, 2001    (KR) ............................... 2001-84481

(51) Int. Cl.
*G06F 12/14*    (2006.01)
*G06F 11/277*    (2006.01)
(52) U.S. Cl. ........................................ 713/193; 714/30
(58) Field of Classification Search ................ 713/193; 714/30
See application file for complete search history.

(56) References Cited

U.S. PATENT DOCUMENTS 4,764,959 A    8/1988    Watanabe et al.
5,313,520 A *  5/1994    Han ............................ 711/163
5,416,783 A *  5/1995    Broseghini et al. .......... 714/728
5,841,968 A *  11/1998   Caldera et al. ................ 714/30
6,321,320 B1 * 11/2001   Fleischman et al. ......... 711/217
2002/0112199 A1* 8/2002  Whetsel ....................... 714/30
2003/0097614 A1* 5/2003  Rajski et al. .................. 714/30

FOREIGN PATENT DOCUMENTS

JP    2001-325153    11/2001
KR    2000-038712    7/2000

* cited by examiner

*Primary Examiner*—Matthew Smithers
(74) *Attorney, Agent, or Firm*—Mayer, Brown, Rowe & Maw LLP

(57) ABSTRACT

Disclosed is a method and apparatus of a code read only memory (ROM) data capable of protecting code ROM data is easily read and plagiarized in field in case of testing a code ROM built-in a microcontrol unit (MCU) The apparatus for protecting data outputted from a code ROM has: a first encryptor for encrypting data outputted from the code ROM; a second encryptor for generating a read enable signal through an encryption process; and an output unit for dumping out the encrypted data outputted from the first encryptor in response to the read enable signal outputted from the second encryptor.

17 Claims, 3 Drawing Sheets

APPARATUS FOR PROTECTING CODE ROM DATA IN CODE ROM TEST

FIELD OF THE INVENTION

The present invention relates to a method and apparatus of a code read only memory (ROM) data; and, more particularly, to a method and apparatus for protecting code ROM data in order that the data are easily read and plagiarized in a field in case of testing a code ROM built in a microcontrol unit (MCU).

DESCRIPTION OF RELATED ART

With development of a semiconductor technology, a number of devices integrated in a unit area are increased, and due to the increase of integration, a plurality of code read only memories (ROMs) are built in a microcontroller.

Also, a size of a code ROM is getting larger and larger because systems are complicated and a program size becomes larger.

Meanwhile, when code ROM data are dumped out for a special aim, such as a test of the code ROM built in the microcontroller, the code ROM data has a possibility of efflux to an outside and being plagiarized by others.

SUMMARY OF THE INVENTION

It is, therefore, an object of the present invention to provide a method and an apparatus for protesting code ROM data of a microcontroller from being plagiarized by a third person, who does not know a password of the data, and even though the data is leaked out to an outside.

In accordance with an aspect of the present invention, there is provided an apparatus for protecting data outputted from a code read only memory (ROM), comprising: a first encryption means for encrypting data outputted from the code ROM; a second encryption means for generating a read enable signal through an encryption process; and an output means for dumping out the encrypted data outputted from the first encryption means in response to the read enable signal outputted from the second encryption means.

In accordance with another aspect of the present invention, there is provided an apparatus for protecting data outputted from a code ROM, comprising: a control state machine unit for generating a control signal for a ROM test operation in response to the test enable signal and the clock signal; a MISR unit for inputting, compressing key data in synchronization with the clock signal in response to the test enable signal; an initializing means for providing an initialization value to the MISR unit in response to the test enable signal and the reset signal; a comparison unit for outputting the read enable signal by comparing value outputted from the MISR unit with an expected value; and an output means for dumping the code ROM data in response to a read enable signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE INVENTION

Hereinafter, an apparatus for protecting code ROM data in a code ROM test according to the present invention will be described in detail referring to the accompanying drawings.

Figure 1:
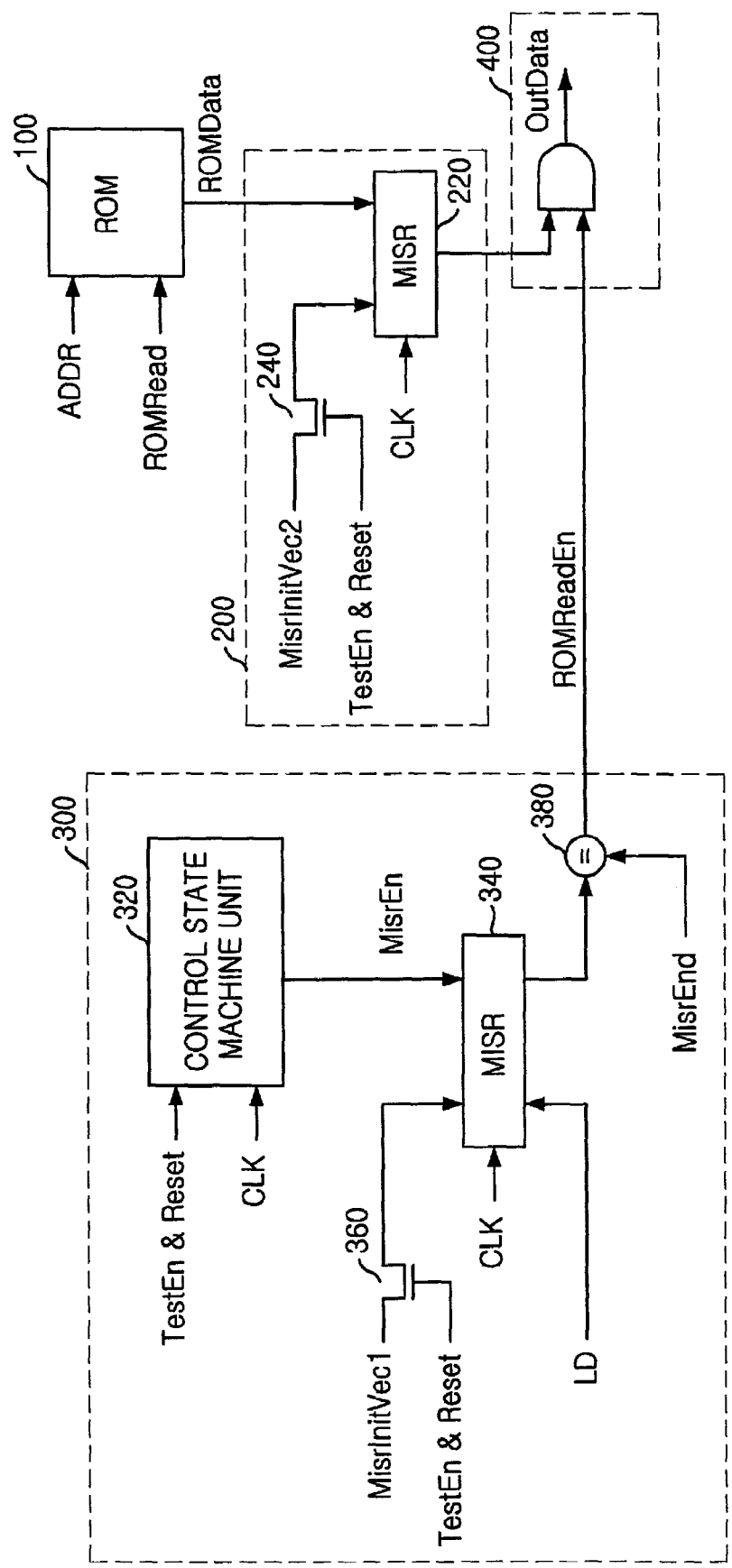
FIG. 1 is a block diagram illustrating an apparatus for protecting code read only memory (ROM) data in accordance with the present invention.

Referring to FIG. 1, a code ROM 100 starts to output data in response to an address signal ADDR and a read command signal ROMRead. An apparatus for protecting code ROM data in accordance with the present invention includes a first encryption unit 200 for encrypting the ROM data ROMData outputted from the code ROM 100, a second encryption unit 300 for generating a read enable signal ROMReadEn, and an output unit 400 for dumping out the encrypted data outputted from the first encryption unit 200 into outside in response to the read enable signal ROMReadEn outputted from the second encryption unit 300.

The first encryption unit 200 includes a multiple input signature analysis register (hereinafter, referred to as a MISR), which compresses the data outputted from the code ROM 100 in synchronization with a clock signal CLK, and a transistor 240 to provide an initialization value MisrInitVec2 to the MISR unit 220 in response to a test enable signal TestEn and a reset signal Reset.

The second encryption unit 300 includes a control state machine unit 320, which generates an enable signal MisrEn for a ROM test in response to the test enable signal TestEn and the reset signal Rest, and outputs the enable signal MisrEn in response to the clock signal CLK. A MISR unit 340 in the second encryption unit 300, which is enabled by the test enable signal MisrEn, receives key data LD in synchronization with to the clock signal CLK. A transistor 360 provides an initialization value MisrInitVec1 to the MISR unit 340 in response to the test enable signal TestEn and the reset signal Reset, and a comparison unit 380 outputs a read enable signal ROMReadEn by comparing a value outputted from the MISR unit 340 unit with an expected value MisrEnd.

The expected value MisrEnd is a value generated in another MISR unit, which has the same configuration as the MISR unit 340, under the condition of recognizing the initialization value MisrInitvec1 and the key data LD.

The output unit 400 includes a logic multiplication gate receiving the read enable signal ROMReadEn from the comparison unit 380 and the compressed and encrypted data outputted from the first encryption unit 200. Accordingly, the encrypted ROM data are outputted in response to the read enable signal ROMReadEn from the comparison unit 380.

The MISR unit 340 is initialized when the test enable signal TestEn and the reset signal Reset are enabled to "1", simultaneously. Then, while the enable signal MisrEn outputted from the control state machine unit 320 is enabled to "1", the MISR unit 340 receives and compresses the key data LD in response to the clock signal CLK.

Successively, the comparison unit 380 compares an output signal from the MISR unit 340 and the expected value MisrEnd, and in case where the two values are accorded, the read enable signal ROMReadEn is enabled to "1" and the value "1" is outputted to the output unit 400.

The read enable signal ROMReadEn of the enabled value "1" is applied to an input terminal of the logic multiplication gate in the output unit 400, and then the read enable signal ROMReadEn makes the encrypted data outputted from the first encryption unit 200 dumped out. That is, a protection function is released due to the read enable signal of the value "1" so that ROM data ROMData are dumped out, as it is.

If the comparison unit 380 compares the output signal from the MISR unit 340 and the expected value MisrEnd, and in case where the two values are not accorded, the read enable signal ROMReadEn is disabled to "0" and then the output unit 400 does not output the encrypted data.

Although the encrypted data is exposed to an outside, a plagiarism by a third person can be prevented because the ROM data are already encrypted by the first encryption unit 200.

Figure 2:
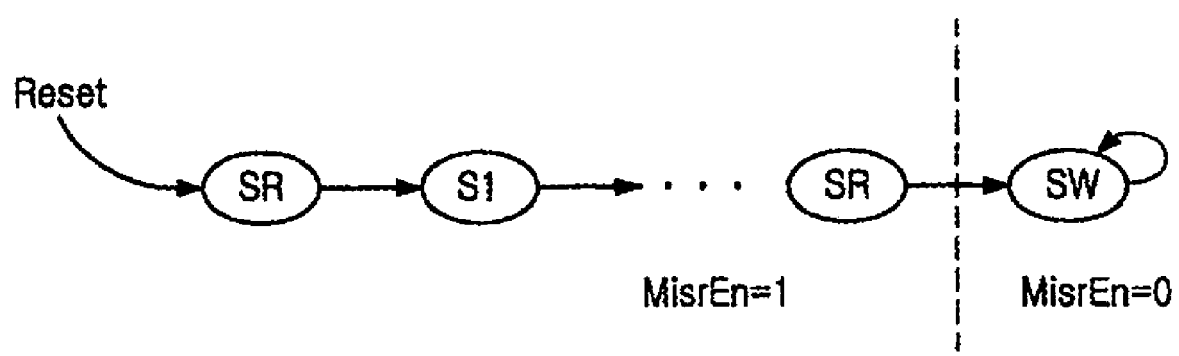
FIG. 2 is a schematic diagram illustrating a control state machine unit in FIG. 1 in accordance with the present invention.

FIG. 2 is an internal structure diagram showing the control state machine unit 320 in FIG. 1 in accordance with the present invention.

The control state machine unit 320 is comprised of lots of internal states, such as SR, S1, SN and SW, so as much as internal states of the key data LD are provided.

When the control state machine unit 320 is initialized in response to the reset signal Reset, the initialized control state machine unit 320 is transited to a SR state and, when N numbers of the key data LD are inputted in response to the clock signal CLK, the initialized control state machine unit 320 is transited to S1, S2, . . . SN states, sequentially, so finally, it is remained in a SW state. At this time, in the SW state, the enable signal MisrEN is disabled to "0", and in the other states, the control signal MisrEN is enabled to "1".

Figure 3:
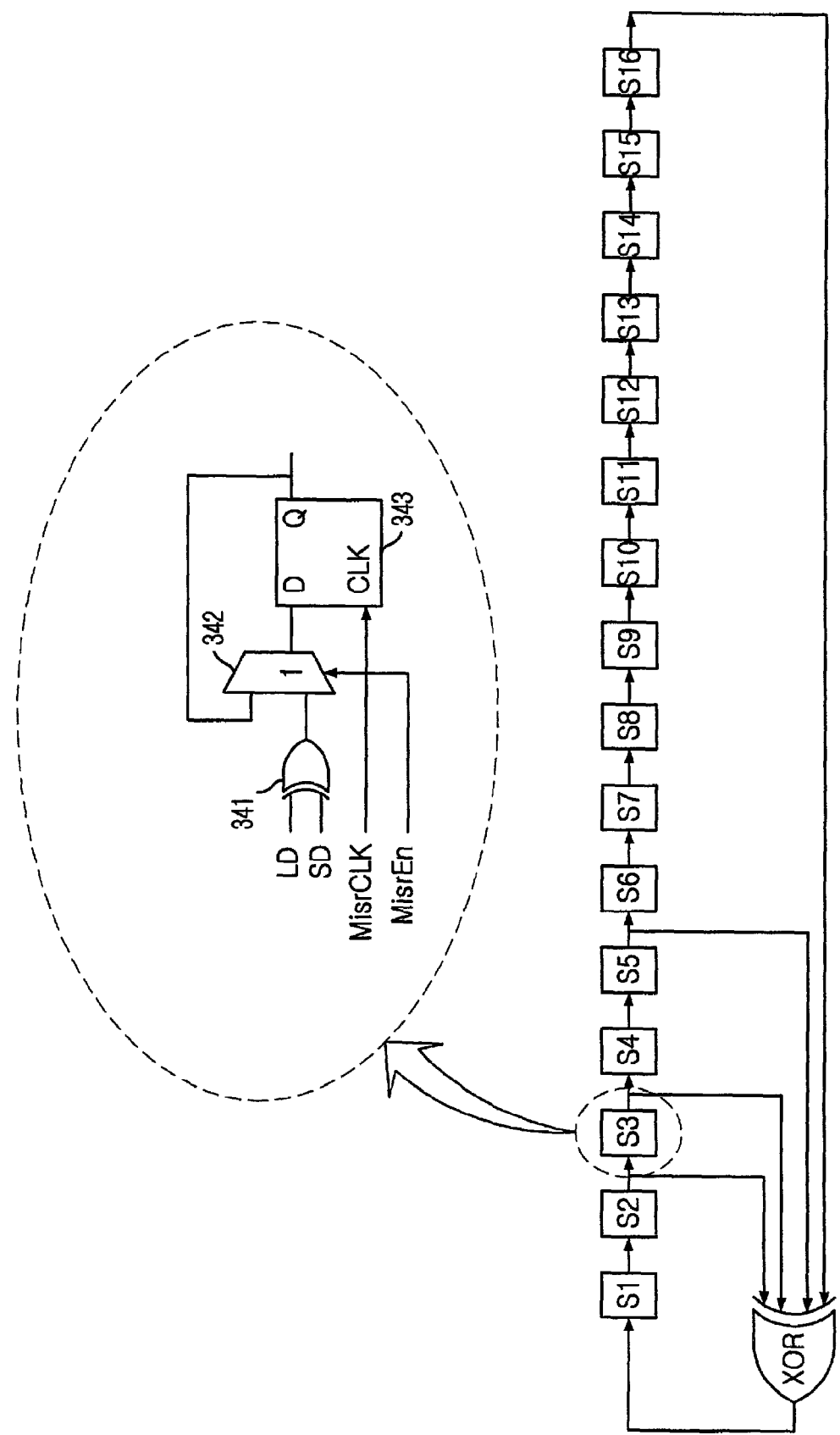
FIG. 3 is a circuit diagram showing a realization of a multiple input signature analysis register (MISR) unit in FIG. 1 in accordance with an embodiment of the present invention.

FIG. 3 is a circuit diagram showing an implement of the MISR 340 unit in FIG. 1 in accordance with an embodiment of the present invention, in which a 16-bit MISR circuit is exemplarily shown.

Referring to FIG. 3, the 16-bit MISR unit provides 16 numbers of MISR unit cells S1 to S16, each of which has a shift resistor structure, and an exclusive OR gate.

The exclusive OR gate receives data outputted from each of $16^{th}$ MISR cell S16, $5^{th}$ MISR unit cell S5, $3^{th}$ MISR unit cell S3 and $2^{th}$ MISR unit cell S2, and performs an exclusive logical summation.

The each of data is outputted in accordance with a 16-bit primitive polynomial ($h(s)=X^{16}+X^5+X^3+X^2+1$).

The MISR unit cells S1 to S16 are serially connected and a first MISR unit cell S1 receives an output signal of the exclusive OR gate. Also, each of 16 numbers of MISR cell corresponds to each term of the 16-bit primitive polynomial.

The MISR unit cell includes an exclusive OR gate 341, which performs an exclusive logic summation by inputting the key data LD and established data stored in the MISR unit cell of at a previous step. A multiplexor 342 selectively outputs an output from the exclusive OR gate 341 and data (Q) stored in a cell.

A flip-flop 343 outputs the output rom the multiplexor 342 to the MISR unit cell in the next step in response to a clock signal MisrCLK. The flip-flop 343 is initialized by an initialization value MisrInitVec1.

Assuming that the key data LD and the initialization values (MisrInitvec1) are 16-bit signals, the initialization value are "FFFFH (in a hexa decimal)," the encrypted data are "OOOOF (in a hexa decimal)," the control state machine unit 320 only carries three steps of conditional transition, and a control signal MisrEn is always in a high level, data of the pre-established key data SD are outputted to the multiplexor 342 when the key data LD are a low level in the each of MISR unit cells S1 to S16. Also, assuming that the control signal MisrEn is always in a high level, an output from the exclusive OR gate 341 is an input of the flip-flop 343, so that an output from the flip-flop 343 is a previous step data (SD).

All the output data of the MISR unit cells S1 to S16 are FFFFH, then the exclusive OR gate 341 outputs a low level, so output values of a first state are "0111111111111111".

Subsequently, among the outputs of the first state, output values of $2^{th}$, $3^{th}$, $5^{th}$ and $16^{th}$ MISR unit cells S2, S3, S5 and S16 are inputted to a first MISR unit cell S1 via the exclusive OR gate (XOR), and then the value is shifted to a $16^{th}$ MISR unit cell S16.

An output value of the first state is "0111111111111111", therefore, among the output values of the first state, all the output values of $2^{th}$, $3^{th}$, $5^{th}$ and $16^{th}$ MISR unit cell S2, S3, S5 and S16 are "1" and an output of an exclusive OR XOR gate (XOR) is "0", so output values from a second state are "0011111111111111".

In the output values of the second state, among the $2^{th}$, $3^{th}$, $5^{th}$ and $16^{th}$ output values, a second output value is "0", so an output of an exclusive OR gate is "1" and then, output values from a third state are "1001111111111111". Therefore, the output values from the third state, 1001111111111111, are inputted to a comparison unit.

There is presented another embodiment of the present invention. That is, the first encryption unit 200 can be omitted so that the ROM data ROMData from the ROM 100 is directly applied to the output unit 400. At this time, since ROM data to be dumped out is encrypted by the second encryption unit 300, a third person may not read the ROM data ROMData.

The present invention protects a dumping of code ROM data built in a microcontroller by a third person, and even though the data is dumped into outside, a plagiarism by a third person may be prevented.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for protecting data outputted from a code read only memory (ROM), comprising:
   the code ROM for storing and outputting the data in response to an address and a read enable signal;
   a first encryption means for encrypting the data outputted from the code ROM;
   a second encryption means for encrypting a test enable signal based on key data to generate a read enable signal; and
   an output means for dumping out the encrypted data outputted from the first encryption means in response to the read enable signal outputted from the second encryption means.

2. The apparatus of claim 1, wherein the first encryption means including:
   a multiple input signature analysis register (MISR) for compressing data outputted from the code ROM in synchronization with a clock signal; and
   an initializing means for providing an initialization value to the MISR unit in response to a test enable signal and a reset signal.

3. The apparatus of claim 2, wherein the initializing means includes a transistor, which provides the initialization value to the MISR unit when all the test enable signal and the reset signal are enabled.

4. The apparatus of claim 1, wherein the second encryption means including:
   a control state machine unit for generating a control signal for a ROM test operation in response to the test enable signal and a clock signal;
   a MISR unit for inputting, and compressing the key data in synchronization with the clock signal;
   an initializing means for providing an initialization value to the MISR unit in response to the test enable signal and the reset signal; and
   a comparison unit for outputting the read enable signal by comparing a value outputted from the MISR unit with an expected value.

5. The apparatus of claim 4, wherein the expected value is a value generated in a condition of recognizing the initialization value and the key data.

6. The apparatus of claim 4, wherein the control state machine unit includes an initial state, a finish state and a plurality of internal states, wherein the control state machine unit transits to the initial state in response to a reset signal, wherein the control state machine unit sequentially transits to a plurality of internal states in response to the test enable signal and the clock signal, wherein the control state machine unit in the final internal state, finally transits to the finish state, wherein the control state machine unit outputs the enabled control signal in the initial state and in the plurality of internal states, and wherein the control state machine unit outputs the control signal in the final state.

7. The apparatus of claim 4, wherein the control state machine unit equips the internal state as much as the number of the key data.

8. The apparatus of claim 4, wherein the comparison means outputs the read enable signal when the compressing value outputted from the MISR unit and the initialization value are the same.

9. The apparatus of claim 4, wherein the initializing means includes a transistor, which provides the initialization value to the MISR unit when all the test enable signal and the reset signal are enabled.

10. The apparatus of claim 4, wherein the output means includes a logic multiplication means for ANDing the encrypted data outputted from the first encryption means and the read enable signal.

11. An apparatus for protecting data outputted from a code ROM, comprising:
   a control state machine unit for generating a control signal for a ROM test operation in response to a test enable signal and a clock signal;
   a MISR unit for inputting, and compressing key data in synchronization with the clock signal in response to the test enable signal;
   an initializing means for providing an initialization value to the MISR unit in response to the test enable signal and the reset signal;
   a comparison unit for outputting a read enable signal by comparing value outputted from the MISR unit with an expected value; and
   an output means for dumping the code ROM data in response to the read enable signal.

12. The apparatus of claim 11, wherein the initialization value is a value generated in a condition of recognizing the initialization value and the key data.

13. The apparatus of claim 11, wherein the control state machine unit includes an initial state, a finish state and lots of internal states, and the control state machine unit transits to the initial state, the lots of internal states, sequentially, and to the finish state, finally, in response to a reset signal, the test enable signal and the clock signal, and in the final internal state, respectively, and then, the initial state and the lots of internal states output the enabled control signal, and the final state outputs disabled the control signal.

14. The apparatus of claim 11, wherein the control state machine unit equips the internal state as much as the number of the key data.

15. The apparatus of claim 11, wherein the comparison means outputs enabled the read enable signal when the compressing value outputted from the MISR unit and the initialization value are the same.

16. The apparatus of claim 11, wherein the initializing means includes a transistor, which provides the initialization value to the MISR unit when all the test enable signal and the reset signal are enabled.

17. The apparatus of claim 11, wherein the output means includes a logic multiplication means for ANDing the encrypted data outputted from the first encryption means and the read enable signal.

* * * * *